April 28, 1959          S. H. SVENSSON          2,883,900
OPTICAL ARRANGEMENT FOR RECORDING OF THE COURSE
OF THE REFRACTIVE INDEX IN
ROTATING CENTRIFUGE CELLS
Filed Feb. 12, 1954
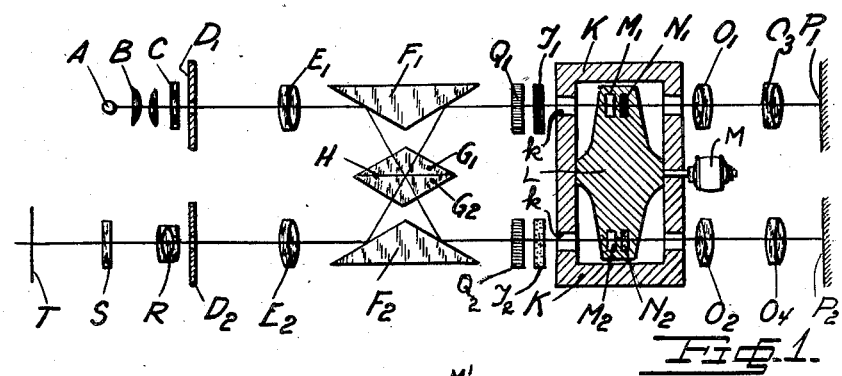
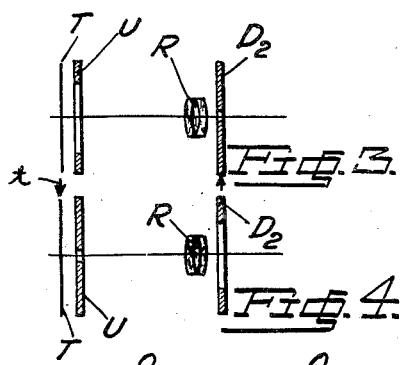
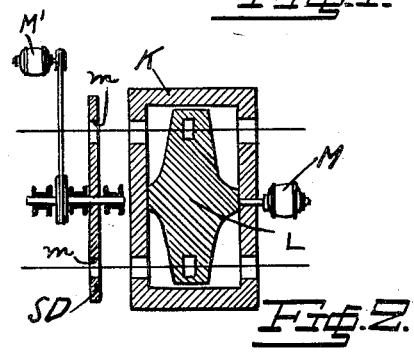
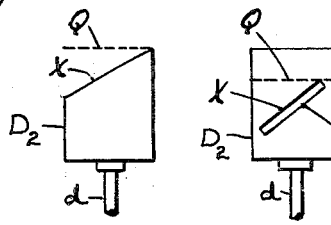
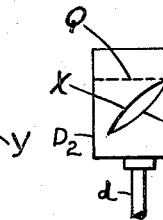
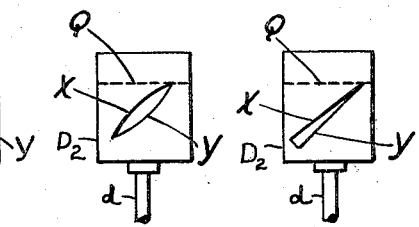
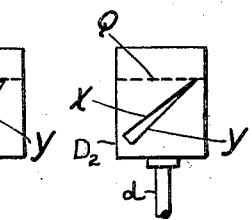
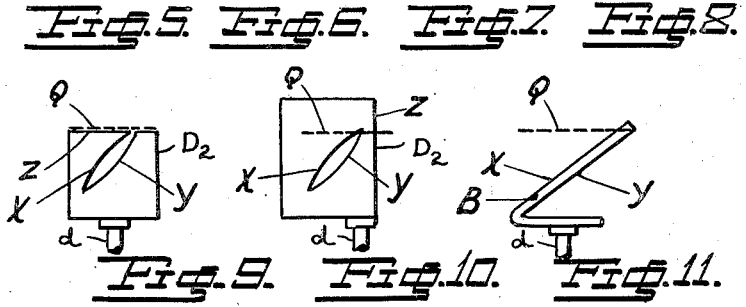
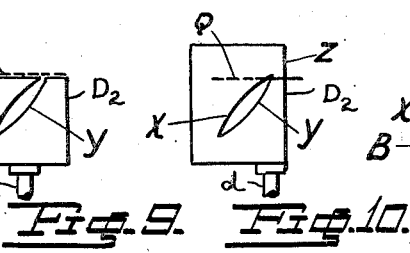
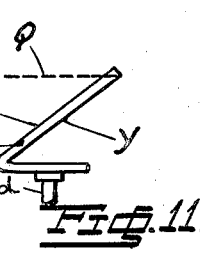
SVANTE HARRY SVENSSON
INVENTOR
By Pierce, Scheffler & Parker
ATTORNEYS

United States Patent Office 2,883,900
Patented Apr. 28, 1959

2,883,900

OPTICAL ARRANGEMENT FOR RECORDING OF THE COURSE OF THE REFRACTIVE INDEX IN ROTATING CENTRIFUGE CELLS

Svante Harry Svensson, Sundbyberg, Sweden, assignor to LKB-Produkter Fabriksaktiebolag, Stockholm, Sweden, a company of Sweden Application February 12, 1954, Serial No. 410,012

Claims priority, application Sweden June 4, 1953

17 Claims. (Cl. 88—14)

For observation and recording of the refractive index course in rotating centrifuge cells, the scale method according to Lamm (Z. physikal. Chem. A 138, 313, 1928; Nova Acta Reg. Soc. Sci. Upsal. IV, 10, nr 6, 1937), lately also the astigmatic modification of the Schlieren method (Philpot, Nature 141, 283, 1938; Svensson, Kolloid-Z. S7, 181, 1939; Kolloid-Z. 90, 141, 1940; Ark. Kem. Min. Geol. A 22, nr 10, 1946) have been used. Both these observation methods give primarily the derivative of the refractive index function with respect to the radius of the rotor. Hence an integration is necessary in order to reach the function itself. Such a procedure in a measurement round the derivative of the desired function is not desirable while, firstly, it necessarily decreases the measuring accuracy and, secondly, involves an increased evaluation work. The scale method in particular is characterized by a very demanding and time-consuming evaluation work.

Kegeles has described an optical method which permits simultaneous measurement of refractive index as well as of its derivative (J. Am. Chem. Soc. 69, 1302, 1947). It makes use of the scale method and a modification thereof, characterized among other things by a double-prismatic centrifuge cell.

Philpot and Cook (Research 1, 234, 1948) have recommended the use of an astigmatic modification of Rayleigh's interferometer for the purpose in question. The arrangement cannot, however, be regarded as particularly suitable, which is perhaps most plainly evident from the fact that still after five years no centrifuge construction has been equipped with the interferometric observation in question. No other interferometric observation methods for centrifuge cells have been described in the literature.

Before the present invention is described, it is worthwhile to consider a little the problems and questions which are encountered when sedimentation measurements in centrifuges are concerned. Such measurements are carried out on high-molecular substances, either at such a high speed that their molecules sediment at a measurable rate (sedimentation rate centrifuging) or at such a low speed that the diffusion after some time keeps an equilibrium with the sedimentation (sedimentation equilibrium centrifuging). In the former method one obtains the sedimentation constant of the substance, i.e. its sedimentation rate divided by the centrifugal force. With knowledge of the diffusion constant and the specific volume, which are measured in special instruments, the molecular weight can then be calculated. In the latter method one obtains the molecular weight without knowledge of the diffusion constant. By the former method, mixtures of different molecular weights can be analyzed, while the latter method works under the condition that the substance under investigation is molecularly homogeneous.

As has been pointed out by Kegeles (J. Am. Chem. Soc. 69, 1302, 1947) and the inventor (Acta Chem. Scand. 3, 1170, 1949), records of the refractive index function as well as of its derivative are needed in both methods of measurement. The ideal observation or recording method is consequently one that permits recording of both these functions, whereby integration as well as differentiation of the primary observation material becomes superfluous.

In most sedimentation measurements some low-molecular substances, mostly salts, must be present in addition to the substance under investigation and the solvent. It cannot be prevented that these will partially sediment too. The recording arrangement should then be such that the effect of this on the recorded refractivity curve is eliminated.

Also it cannot be avoided that the compression of the solvent due to the high pressure prevailing in the cell affects the optical thickness of the cell. The observation arrangement should pay due attention to this and, if possible, bring about an automatic elimination of this effect.

The same reason also causes a certain distortion of the cells by their walls tending to bulge, which also affects the optical thickness. The observation arrangement should as far as possible permit a correction of this effect.

Since the sample cell occupies just a small angular range in a tangential direction, an optical observation arrangement for a centrifuge requires a light intensity 100–200 times as high as a corresponding arrangement for a resting cell.

The observation arrangement should further be self-recording, or in any case not encumber the research worker with an excessively large evaluation work. It is true that the price of the arrangement may be allowed to be rather high, since the centrifuge construction itself is very expensive, but it should of course be kept as low as possible without risking the fulfillment of the above-mentioned requirements.

As has been truly pointed out by Philpot and Cook in the work cited above, one obtains an automatic elimination of the effects of the sedimentation of low-molecular substances and of the compression of the solvent by having in the rotor two identical cells, one filled with a sample, the other with the same solution except the high-molecular substances which are to be investigated. Simultaneously a certain but not complete compensation of the cell distortions is obtained. The present invention makes use of the same principle with a reference cell, but is different from Philpot-Cook's suggestion by the two cells not bordering on each other but lying on diametrically opposite points in the rotor. Hereby the possibility of using a continuously burning light source is gained, while according to Philpot-Cook's suggestion one has to use a stroboscope lamp well synchronized with the rotor.

This principle being fixed, new problems, however, arise which will have to be solved. Primarily, the two coherent beams of light have to be turned 180° relatively to each other in order to make possible that everywhere in the cells two pencils passing them at the same distance from the centre of rotation interfere with each other. Secondly one must arrange for the two cells to be optically focussed by a lens system on one and the same image plane and in such a manner that the cell images coincide. In interferometric investigations, the reference object (a reflecting plane glass or a reference cell) is generally optically plane and homogeneous, and thus it need not necessarily be optically focussed. Only the object under investigation has to be in focus or be directly observed by the eye. In the present case the reference object is not plane and homogeneous but is subject to part of those changes in optical thickness which occur in the sample cell. It is consequently not possible to get any interference fringes unless both cell and reference cell are optically conjugate to the observation plane.

Thirdly, one has to prevent the two interference patterns, resulting from the fact that the two cells constantly change positions, from destroying each other.

Michelson's interferometer differs from Jamin's essentially by the fact that the light is forced to return the same way by reflexions at the object as well as at the reference object. Hereby is gained, partly a doubled optical resolution, partly a certain reduction in the costs due to the fact that the interferometer plate serving as a light-splitting device can also serve the function of reuniting the coherent beams of light. These advantages are of course highly desirable in a centrifuge construction too.

In the present invention, which will now be described in detail, all requirements and demands put forward above have been realized. It is characterized by an interferometric system of high light intensity, designed especially for the present requirements. It can, moreover, be combined with a special optical system for autocollimation, and with a system which permits the simultaneous recording of the refractivity function and its derivative.

The light intensity is comparatively low in ordinary interferometric devices due to the necessity of using light sources of very small extension. Since this point-shaped light source must lie exactly on the optical axis, a considerable difficulty of adjusting such instruments is also a consequence.

An interferometric arrangement characterized by a complete symmetry around the light-splitting foil permits the use of an extended light source, a fact that has not been pointed out anywhere in the optical literature, as far as the inventor knows. The arrangement according to the invention is thus primarily characterized by a symmetric interferometer construction, whereby one simultaneously gains an abundant light intensity and neglible difficulties at the adjustment.

The requirement that the two coherent light pencils shall pass the two cells in the rotor at the same distance from the centre of rotation is satisfied in the following way. The plane of the light splitting foil is brought to coincide with the rotor axis and the object stops of the optical system are placed in a plane through the rotor axis and perpendicular to the light-splitting foil. Due to the symmetry around the foil, mutually coherent light beams become mutual mirror images with regard to the foil, and the fulfilment of the requirement is logically evident.

The requirement that the middle sections of the cell and the reference cell should both be optically conjugate image planes to the observation plane is also fulfilled smoothly and without taking special measures by the interferometer arrangement which is mirrorsymmetric round the light-splitting foil, since the two coherent beams of light pass through the same distances in glass and air in the same order. As a contrast to this one can regard the interferometric arrangement according to Jamin. If the cell and the reference cell are placed in the same plane perpendicular to the light path between the two interferometer plates, they will get different geometric-optic distances to a lens system standing outside the planes.

Still better results are obtained if the oblique plane-parallel plates characteristic of Michelson's and Jamin's interferometers are abandoned. As is well-known, a plano-parallel plate standing perpendicularly to the light path causes a certain displacement of the optical image plane. Otherwise it only affects the chromatic and spherical aberrations of the system in a way that can easily be corrected by taking these properties into consideration when designing the lens system. The fact that the contributions of such a plate to the spherical aberration is rather small appears mathematically in the manner that only every second power is to be found in the corresponding power series. An inclined glass plate is more dangerous from a dioptrical point of view. Its optical phase shift, parallel displacement of a light beam, and displacement of the optical image plane is strongly dependent on those differences in entrance angles which occur in a divergent or convergent light beam. Mathematically this appears in the way that, if the mentioned properties are developed into power series as functions of the angle of a pencil with the central one in the beam, all powers are present in the series. Already the second-degree term will consequently cause optical aberrations which cannot, like third-degree terms, be corrected for by a special design of the lens system. According to the present invention, therefore, all refracting surfaces of the optical system are oriented perpendicularly to the central ray of the light beams.

Front surface mirrors, on the other hand, can be used anywhere in the system without violating the principle of the invention. As a matter of fact, the use of such mirrors forms an exception to the requirement of complete mirror symmetry with regard to the light-splitting foil.

When the rotor rotates, the two cells change places twice every turn. That does not matter if the two interference patterns which correspond to these two opposite cell positions are completely identical, and no measures need then be taken. It should, however, be very difficult to realize this ideal condition. According to this invention, therefore, special measures are taken to sort out only one of these interference patterns.

According to one method for this purpose, one uses outside the rotor house a stroboscope, i.e. a rotating disk with an axis coinciding with the rotor axis and in the periphery of which there are a number of radially oriented holes at least as large as one of the cells. This disk is rotated at such a speed that the cells are constantly illuminated when they are in one position, but are constantly screened off by the spaces between the holes when they are in the opposite position.

Another method consists in placing outside the rotor, on the entrance side of the radiation, in the way of each light beam, two optical polarizors, one with a radial, the other with a tangential polarization direction, and within the rotor in front of or behind the cells, two similar polarizors, each with one of the mentioned polarization directions. The plane polarized light which then enters the rotor house can then pass through the cells only when they are in their "correct" positions. The beams of light emerging from the rotor will then be polarized perpendicularly to each other. In order to bring them to interference it will consequently be necessary first to turn their polarization planes relatively to each other until they coincide. This can be done by methods known from the optics, e.g. by the use of quartz plates of a suitable thickness, cut perpendicularly to the optic axis. In order to retain the same optical thickness in both light paths, it is suitable to turn one polarization plane to the right as much as the other polarization plane is turned to the left.

To arrange autocollimation when the objects are rotating cells is connected with special difficulties. It is unthinkable simply to make the back walls of the cells reflecting, because they are not accessible for adjustment and cannot in any other way be made coplanar with the necessary optical precision. It is not either possible to place a mirror, sufficiently large to reflect the light in both ligh paths, outside the rotor, because the distance between this mirror and the cell becomes too great. After the reflexion the light will come back to another point in the cell than at the first passage, which will cause systematic errors.

According to this invention, autocollimation is arranged by having two fixed mirrors outside both rotor and rotor house and by producing optical images of these mirrors on the back walls of the cells with the aid of special lens systems. The following discussion shows that it is impossible in this connection to use arbitrary lens systems. It also shows which conditions the lens systems in question have to satisfy in order to function properly.

In every perfect optical imagery, different pencils from one and the same point of the object will all traverse the same optical path length through the lens system on to one and the same point in the optical image. This optical path length is, however, generally different for different points in the object and image planes. What is now required in autocollimation in interferometry by optical imagery of a mirror on the object, must be that the optical path length between object and image points be constant, not only for all rays from the same object point, but also for all object points. Otherwise a phase difference between different points of the cell would be obtained which does not depend on the refractivity function of the cell, but on the lens system giving an image of the mirror. It is true that this extra phase difference would be partly or completely corrected for by the fact that it would also be obtained in the reference cell, but it would nevertheless be disadvantageous, among other things with respect to the simultaneous use of the Schlieren method or some of its variants for recording of the refractivity derivative. These curves would then be oblique, as well as their base lines.

What is required of the optical system making an image of the mirror can also be expressed in the following way. If a pencil after the passage of the cell forms the angle $\alpha$ with the optic axis, and if it then passes through a lens system and is reflected by a mirror perpendicular to its optic axis and placed in the conjugate image plane of the back wall of the cell, then the lens system has to be such that the pencil returns to the same spot in the mentioned wall and with the angle $-\alpha$. Such an optical system, if it exists, is completely equivalent to a cell with a reflecting back wall.

A lens system which satisfies this condition exists and consists of two identical lenses centered on the same optic axis at such a distance from each other that two focal planes coincide. Such a lens system always makes an image in the scale 1:1, and the distance between object and image is always $4f$ plus the double distance between the principle planes of one of the lenses. According to this invention, consequently, autocollimation is arranged by optical imagery through such lens systems of two fixed, adjustable mirrors on to the back walls of the cells.

According to the invention, one can also combine the interferometric observation arrangement, which gives directly the refractivity function, with some of the known automatic modifications of the Schlieren method, which give directly patterns of the derivation function of the refractivity. In this connection the main interest is bound to the astigmatic modification mentioned in the introduction, but a mechanical modification described by Longsworth (J. Am. Chem. Soc. 61, 529, 1939) can also be combined with interferometric observation according to this invention.

Both these derivative-recording methods are based on the angular deflection of light in the cell in the direction of the refractivity gradient, which deflection is proportional to the magnitude of said gradient. In both methods, this light deflection is transformed into a proportional displacement on the observation plane with the aid of an arrangement which in the mechanical modification consists of a narrow slit closely in front of the plate and parallel with the refractivity gradient, and of a mechanical device for simultaneous movement of the plate perpendicularly to and of the Schlieren diaphragm parallel with the direction of the refractive index gradient. In the astigmatic modification this arrangement consists of a diagonal slit, edge, or wire instead of Schlieren diaphragm and of an astigmatic lens system which in a section parallel with the refractive index gradient gives optical imagery of the cells and in a section perpendicular thereto optical imagery of the diagonal slit, edge, or wire on the photographic plate.

Examples of how to combine the astigmatic derivative-recording method with interferometric recording by Rayleigh's interference method have been described by the inventor in two articles, Acta Chem. Scand. 4, 399 (1950) and 5, 1301 (1951). The corresponding combination can be carried out with the interferometric arrangement in question here by the introduction of the optical components necessary for the recording of the derivative in such a way that the functioning of the interference method is not disturbed.

The described methods are explained hereinafter in connection with the accompanying drawings, in which:

Fig. is a schematic horizontal section through apparatus embodying the invention;

Fig. 2 is a fragmentary plan view, with part in section, of a modification;

Figs. 3 and 4 are fragmentary horizontal and vertical sections, respectively, of apparatus comprising a mechanical modification of the Schlieren method; and Figs. 5–11 are elevations of different forms of partially light-obstructing diaphragms.

Fig. 1 shows an optical arrangement designed in connection to a centrifuge rotor L driven by motor M, in which use is made of all particular devices above described, except, however, the stroboscope. A is a light source which together with a filter C delivers monochromatic radiation. B is a condensing lens system, and $D_1$ a slit with an adjustable opening standing in the focal plane of the lens $E_1$. $F_1$ and $F_2$ are two glass prisms with 120° top angle. The sides of the prisms forming the top angles are coated with a reflecting material, e.g. a thin silver foil. The prisms are positioned so that their four reflecting sides are mutually parallel. Between them the double prism $G_1G_2$ with a half-transparent foil H in optical contact with both prisms is situated. This double prism is so adjusted that the rotor axis lies in the plane of the foil and so that the prisms $F_1$ and $F_2$ become exact mirror images with regard to the foil. $J_1$ and $J_2$ are two optical polarizers, one being oriented in a radial, the other in a tangential direction. K is the rotor house having in a front wall constituting a diaphragm provided with two slit-shaped apertures situated on a line perpendicular to and intersecting and on opposite sides of an extension of the rotor axis to admit light beams to the cells $M_1$ and $M_2$. After the cells $M_1$ and $M_2$ are optical polarizers $N_1$ and $N_2$ with tangential and radial orientation, respectively. $O_1$, $O_2$, $O_3$ and $O_4$ are four identical objectives placed in pairs on each one optical axis at such a mutual distance that the two inner focal planes coincide. The accurately plane mirrors $P_1$ and $P_2$ are accurately adjusted perpendicularly to the optic axis and are situated in the conjugate image planes of the nearest cell walls. $Q_1$ and $Q_2$ are two quartz plates, one turning the polarization plane to the right, the other to the left, and so thick that each plate turns the polarization plane 45°. The objective $E_2$ may be identical with $E_1$ and recollects the light to form an optical image of the slit $D_1$ on the partially light-obstructing device $D_2$. The objective R gives in a section parallel with the plane of the drawing an optical image of the cells on the photographic plate T. S is a cylindrical lens, the axis of which lies in the plane of the drawing. In a section perpendicular to this plane, $D_2$ and T are conjugate image planes.

The partially light obstructing device $D_2$ comprises a diaphragm having light-absorbing and light-transmitting portions separated along at least one sharp edge which intersects the image of the light source slit near one end thereof, and may take various constructional forms as shown in Figs. 5 to 11. The diaphragms D are carried by shafts $d$ which may be mounted in supports, not shown, on which the diaphragms may be angularly adjusted. As shown in Fig. 5, the diaphragm D is an opaque sheet having a sloping top constituting the edge X which intersects the image Q of the slit of diaphragm $D_1$ near one end thereof. The diaphragm D of Fig. 6 is an opaque sheet provided with a slit with parallel sides X and Y. A slit of uniform width is not essential, however, as the sides X, Y may be curved to form a lenticular slit, Fig. 7, or straight and inclined to form a wedge-shaped slit, Fig. 8. It is also possible, as shown in Fig. 9, to have, in addition to the edges X and Y, a third edge Z which substantially coincides with the slit image Q, or a third edge Z which is intersected by image Z, Fig. 10. A simple form of diaphragm, as shown in Fig. 11, comprises a bent strip of opaque material B having opposite edges X and Y.

As shown in Fig. 2, the light polarizing elements may be omitted when the significant light beams are controlled by a stroboscope, i.e. an apertured disk SD outside the rotor housing K and rotated by motor M', the disk being provided with $m$ equidistant apertures so positioned that each cell is continuously illuminated in one radial position thereof and constantly screened off in its diagonally opposite position when the disk SD is rotated at a speed equal to $1/m$ the speed of the rotor L.

The Fig. 1 apparatus functions in the following way. From the lens $E_1$, parallel, monochromatic radiation originates and proceeds against the prism $F_1$. From this the light is reflected obliquely against the interferometer prism $G_1G_2$ with the light-splitting foil H. From this, there will consequently be one beam of light that is reflected back again to the other reflecting surface of the prism $F_1$ and one beam of light that passes through the foil and is reflected against the corresponding surface of the prism $F_2$. These beams of light are now coherent and become also parallel after the last-mentioned reflexions. The mutual distance between the prisms is such that the two beams of light are directed each to one cell in the rotor. Before they come there, however, they will first pass the quartz plates $Q_1$ and $Q_2$ and then the polarizers $J_1$ and $J_2$. At the quartz plates the light is still unpolarized, hence they have no effect whatsoever at the first passage of light, but at $J_1$ the light is polarized in a radial and at $J_2$ in a tangential direction. Beside the cells in the rotor there are two polarizers $N_1$ and $N_2$ of the corresponding orientations, hence the light passes undisturbed in that position of the rotor which is shown in the figure. On the other hand, in the rotor position 180° therefrom no light comes through the rotor. The lens system $O_1O_3$ or $O_2O_4$, respectively, together with the mirror $P_1$ or $P_2$, has, as was mentioned above, the property of conducting the light back through the cells without introducing any phase differences between the cells or between different points in the same cell. The returning light is of course still plane polarized, hence the quartz plates $Q_1$ and $Q_2$ will now show their action of turning the polarization planes 45° in opposite directions. They become thus parallel, and the light beams can consequently interfere with each other. After a first reflection against the prisms $F_1$ and $F_2$, the coherent beams will meet in the foil H, where they are reunited, reflected against the other inclined surface of the prism $F_2$ and directed into the lens system $E_2RS$.

In order to facilitate the understanding of the simultaneous recording of refractive index and its derivative, we can first imagine the optical elements $D_2$ and S as absent. One then has refractive index recording only. This functions simply in the way that the lens system $E_2R$ gives superimposed images of the two cells on the plane T. This is posssible since the geometric-optical distance from cell to lens system is the same for both cells. The common cell image will be filled by a system of interference fringes since all interference conditions are satisfied: the two beams of light are coherent, they pass through the same optical path length but for the differences in the optical thicknesses of the cells which are to be measured, and at the reunion of the beams in the foil H their polarization planes are parallel. The method will function for a tangential as well as for a radial variation of the optical thickness in the cells as long as they are stationary. At the rotation the interference fringes will, however, be blurred if the tangential variation exceeds half a wave-length. The mirrors $P_1$ and $P_2$ should therefore be so adjusted that possibly present interference fringes all have a tangential direction when the cells are stationary and contain a homogeneous liquid. The method will function for a form and magnitude of the opening $D_1$ which is arbitrary within wide limits: it may be point-shaped, slit-shaped in any direction, rectangular, or circular.

If we next consider the recording of the refractive index derivative by the astigmatic method solely, we must first put the same requirement on the refractivity function of the cell as in the interference method: the gradient of the optical thickness must have a radial direction. The difference is only that this condition must be satisfied even for stationary cells. Further the opening $D_1$ has to be slit-shaped. In all literature on this method it is said that this light source slit has to be perpendicular to the refractive index gradient in the cell, i.e. horizontal for non-rotating cells with stratified solutions. This is, however, not necessary, the slit in question can have any orientation except parallel with the refractive index gradient. In the present case it can be said that the light source slit shall form an angle with the radial coordinate axis of the cells when they are in their observation positions. The partially light-obstructing device $D_2$ is situated in the optical image plane of the light source slit and can universally be described as a diaphragm having light-absorbing and light-transmitting portions separated along at least one sharp edge which intersects the image of the light source slit in one end. The angle at this point of intersection defines the sensitivity of the recording of the derivative. The partially light-obstructing device can thus be rotatable round the said point of intersection in order to obtain a continuously variable sensitivity. One can also have exchangeable diaphragms characterized by different, fixed sensitivities, or a linearly displaceable diaphragm which contains in succession in the displacement direction light-obstructing edges of different angles. Finally a varying sensitivity can also be obtained by one single, fixed partially light-obstructing component $D_2$, while the above-mentioned constructions are instead applied to the light source slit.

In the simplest case the partially light-obstructing device has the form shown in Fig. 5 and comprises a single rectilinear edge between transparent and opaque material. One then obtains one full-shadow, one half-shadow, and one bright field on the light-indicating device T.

The border line between the first two fields will then give the contour of the derivative of the optical thickness of one centrifuge cell with respect to the radius, the border line between the latter two fields the corresponding function of the other centrifuge cell.

If the partially light-obstructing device has two mutually parallel, adjacent, rectilinear edges between transparent and opaque material, as shown in Fig. 6 one can denote it as a slit if the transparent material lies between the edges. One will then obtain on the light-indicating device two bright curves on a dark background, one representing the derivative of the optical thickness of the sample cell, the other representing the corresponding derivative of the reference cell. On the other hand, if the optically opaque material lies between the two edges, the partially light-obstructing device can be designed in the form of a bar, a stretched wire or band, see Fig. 11. One will then obtain on the light-indicating device two curve-shaped half-shadows, one showing the course of the derivative of the optical thickness of the sample cell, the other showing the corresponding function of the reference cell.

In the literature on the astigmatic derivative-recording method, one finds advice to use lenticular slits. The form of this slit should then be such that the midpoints of the segments which the slit cuts out from straight lines parallel with the optical image of the light source slit all lie on one and the same straight line. Otherwise the curves obtained will suffer from systematical errors. Derivative curves obtained by lenticular slits are characterized by being of a more uniform thickness along their whole course than curves obtained by parallel slits. The same effect is of course obtained by the use of partially light-obstructing devices in which the material within the contour of the lenticular area is opaque, the material outside it transparent. When lenticular light-obstructing devices are used, one tip of the lenticular area shall coincide or nearly coincide with one end of the optical image of the light source slit, see Fig. 7.

A wedge-formed partially light-obstructing device, with its tip lying in the same way as above described for the lenticular area, can also be used, see Fig. 8.

In the astigmatic derivative-recording method, there is at least one cylindrical lens S which together with the spherical objective R forms an astigmatic system with two different focal lengths in two mutually perpendicular sections. The axis of the cylindrical lens is so oriented that these sections become the radial and tangential sections through the cells in their observation positions. The focal lengths and the adjustment are such that the cells and the light-indicating device T are conjugate image planes in the radial section, while the partially light-obstructing device $D_2$ and the light-indicating device T are conjugate image planes in the tangential section. The method will now function in the following way. In the cells the light gets an angular deflection in the direction of the gradient of the optical thickness, and this angular deflection is proportional to the magnitude of this gradient. Since we have already assumed that the gradient is radially directed, it follows that the light deflection also occurs in the radial direction, which causes the image of the light source slit to be displaced in this direction in the plane of the partially light-obstructing device. This device has at least one edge forming an acute angle with the slit image, hence the point of intersection between this edge and the slit image is displaced along the edge. The displacement of this point of intersection will consequently get a tangential component, which was not the case with the image of the light source slit. Due to the optical imagery of the partially light-obstructing device on the light-indicating device in the tangential section, the mentioned tangential component will be transferred to the light-indicating device. On account of the simultaneous optical imagery of the cells in the radial section on the same light-indicating device, the tangential displacement there will, for every radial cell coordinate, be proportional to the gradient of the optical thickness prevailing at this coordinate.

It is evident from the above that the partially light-obstructing device together with the cylindrical lens constitutes an optical arrangement for transformation of the originally radial light deflection in the cell into a tangential light deflection, proportional thereto, on the light-indicating device. Such an arrangement is necessary since the radial coordinate axis of the latter is occupied by the imagery of the cell.

The derivative of the optical thickness of the cell with respect to the radial coordinate can also be recorded by a mechanical method, see Figs. 3 and 4. In this method, the lens S of the Fig. 1 apparatus is omitted and instead there is a diaphragm U with a narrow slit parallel with the radial coordinate axis closely in front of the light-indicating device T, which slit cuts out a narrow strip of the coinciding cell images. The partially light-obstructing device $D_2$ is still in the conjugate image plane of the light source slit. Finally, the mechanical derivative-recording arrangement is characterized by an arrangement for a simultaneous, slow displacement of the partially light-obstructing device in a radial and of the light-indicating device in a tangential direction, as indicated by arrow $t$ in Fig. 4.

It is then easily realized that the partially light-obstructing device together with the fixed slit closely in front of the light-indicating device and the above-mentioned displacement arrangement constitutes a mechanical arrangement for transformation of the originally radial light deflection in the cell into a tangential light deflection, proportional thereto, on the light-indicating device.

After this presentation of the individual observation methods and their different variants, it is easy to understand how a combined arrangement for simultaneous recording of both interferogram and derivative curve functions. We will then first assume that the astigmatic method for recording the derivative is used.

The optical components necessary for the interferometric method, which are of course not to be found in earlier available descriptions of the astigmatic derivative-recording method, will in no way prevent the function of the latter. The same can be said of the arrangement for autocollimation and the polarizers and devices for rotation of the polarization plane shown in Figure 1.

Among the components which serve the recording of the derivative but not the interference method, there is a device which can be thought to disturb the latter method, viz. the partially light-obstructing device. It is quite natural that interference cannot take place if one of the coherent light beams is obstructed. One must consequently expect those portions of the image field which are illuminated by both the coherent beams to contain interference fringes, but not other portions. The portions of the image, being with and without fringes respectively, border, however, on each other along a curve which is identical with the derivative of the optical thickness of one cell, according to what has been shown before. When combined recording is used, therefore, the conclusion is justified that the derivative contour will be defined as the boundary line between portions of the image field with and without interference fringes.

It was mentioned above in the description of the astigmatic derivative-recording method that three fields, viz. one non-illuminated, one half-illuminated, and one fully illuminated field, are obtained on the light-indicating device if an element with only one straight boundary line between optically transparent and opaque material is used as a partially light-obstructing device. It follows that, when the combined recording method is used, only the latter field can be filled with interference fringes. The two contours between the three fields visualize the courses of the derivatives of the optical thicknesses of the cells with respect to the radius. The contour originating from the reference cell is generally straight and can suitably be denoted as a reference line, while the contour originating from the sample cell is the desired gradient curve of the sample. Which of the two outer fields that becomes filled with interference fringes depends upon the order in which the transparent and opaque materials come in the partially light-obstructing device when passing from the centripetal to the peripheral parts of the cell images. In one case the interference fringes are obtained below the reference line, in the other above the gradient curve.

If a bar, a stretched wire or a stretched band, or the corresponding lenticular constructions, are used as partially light-obstructing devices, the whole image field will be illuminated by both coherent beams of light except the gradient curve and the reference line. Interference fringes will therefore appear everywhere except there, and these lines will be visualized as portions free from fringes in a background filled with fringes.

If a slit or the corresponding lenticular construction is used as a partially light-obstructing device, no portions of the image field will be illuminated except the gradient curve itself and the reference line. The conditions for interference are thus only satisfied where these two lines overlap or superimpose. One can, however, bring about interference fringes throughout the whole cell if certain conditions are satisfied and by the use of a special construction of the partially light-obstructing device. If the second derivative of the optical thickness of the reference cell is equal to zero, all light from this cell will be collected into one single, sharp image of the light source slit, while the light from the sample cell will be spread out over a rhomboidal or rectangular surface, due to a non-vanishing second derivative in that cell. The light from the reference cell will then be collected into one of the edges of this area. If, now, this light is allowed to pass unobstructed, it will uniformly illuminate the whole image field. If, moreover, light is also allowed to pass through a slit running along the diagonal in the mentioned rhomboid or rectangle, this light will form the derivative curve on the observation plane. Both coherent beams of light will therefore arrive only at the derivative curve, which consequently appears filled with fringes in a background free from fringes. The partially light-obstructing device which gives such a result can be described as a mechanical construction element with at least three edges between opaque and transparent material, two of which form together a slit that makes an acute angle with the optical image of the light source slit, and the third one coincides with said image.

There is also another way of producing an interferogram together with a derivative curve obtained by a diagonal slit. One then uses a partially light-obstructing device consisting of a mechanical construction element with at least three edges between transparent and opaque material, two of which form together a slit making an acute angle with the optical image of the light source slit, the third being parallel wtih the radial coordinate axis of the cell images and crossing the optical image of the light source slit. Within the region outside the third edge, both coherent light beams are then allowed to pass. Within the corresponding region of the light-indicating device one thus obtains an interferogram. In the region within the third edge the light can only pass through the diagonal slit, which light, as is well known, forms a gradient curve and a reference line without interference fringes on the light-indicating device.

If the mechanical derivative-recording method is used, a simultaneous exposure of an interferogram is carried out in the following way.

If the partially light-obstructing device has just one edge between transparent and opaque portions, the image will consist of three fields, viz. one non-illuminated, one half-illuminated and one fully illuminated field, and the boundary lines between these three fields are the derivative contours of the optical thicknesses of the cells, i.e. the gradient curve of the sample and the reference line. Interference fringes can only appear in the fully illuminated field. Whether this field is that below the reference line or that above the gradient curve depends upon the order in which transparent and opaque material follow each other in the partially light-obstructing device when one passes from the centripetal to the peripheral parts of the cell images.

If the partially light-obstructing device has two adjacent edges between transparent and opaque material, with the latter between the edges, both light beams will arrive at all points of the image field except the gradient curve and the reference line, which will both be only half-illuminated. These two contours will thus appear free from fringes in a background filled with fringes.

Finally, one can obtain side by side an interferogram free from a laid-in derivative curve and a derivative pattern free from fringes in the mechanical derivative-recording method too, viz. by a special procedure. The partially light-obstructing device must then possess two adjacent, mutually parallel edges between transparent and opaque material, the former being between the edges. As is well known, such a device gives rise to a bright gradient curve and a bright reference line on a dark background, and interference fringes can only appear in regions where these lines overlap or coincide. If, now, the photographic plate is exposed during its slow movement a little while before the partially light-obstructing device is put in place, or if the latter is taken away a little while before the exposure of the plate during its slow motion is stopped, one will of course obtain rectangular interferograms below or above the derivative pattern, since both coherent light beams have been allowed to arrive at these portions of the plate.

I claim:

1. An apparatus for recording the refractive index of a solution in a rotating centrifuge cell, comprising a centrifuge including a housing and a rotor, a sample cell and a reference cell in said rotor in diametrically opposite positions, a wall of said housing constituting a cell diaphragm perpendicular to the rotor axis which is opaque to light except for two slit-shaped apertures, said apertures being situated on a line perpendicular to and intersecting the extension of the rotor axis, and at a mutual center distance equal to that between said cells, means for producing a beam of monochromatic light, means for splitting said beam into two coherent beams, said splitting means including a half-transparent foil oriented in a plane containing said rotor axis and perpendicular to said line on which said apertures are situated, said half-transparent foil being enclosed between and in optical contact with two congruent plane surfaces of two prisms of an optically transparent and homogeneous material having outer surfaces which are mutual mirror images with respect to said foil, means for making said two coherent beams parallel with the rotor axis and for directing them through said diaphragm apertures against said cells, means for reuniting said two coherent parallel beams after having passed said cells, a light indicating member, and a lens system to make the optical middle sections of said cells and said light-indicating member optically conjugate at least in a section parallal with said line on which said apertures are situated.

2. An apparatus as claimed in claim 1, in which the outer surfaces of the prisms of the beam-splitting means are perpendicular to the directions of the central rays of the beams penetrating said surfaces.

3. An apparatus for recording the refractive index of a solution in a rotating centrifuge cell, comprising a centrifuge including a housing and a rotor, a sample cell and a reference cell in said rotor in diametrically opposite positions, a wall of said housing constituting a cell diaphragm perpendicular to the rotor axis which is opaque to light except for two slit-shaped apertures, said apertures being situated on a line perpendicular to and intersecting the extension of the rotor axis, and at a mutual center distance equal to that between said cells, means for producing a beam of monochromatic light, means for splitting said beam into two coherent beams, said splitting means including a half-transparent foil oriented in a plane containing said rotor axis and perpendicular to said line on which said apertures are situated, said half-transparent foil being enclosed between and in optical contact with two congruent plane surfaces of two prisms of an optically transparent and homogeneous material having outer surfaces which are mutual mirror images with respect to said foil, means for making said two coherent beams parallel with the rotor axis and for directing them through said diaphragm apertures against said cells, light-controlling means situated on the axes of said two coherent parallel light beams for permitting the passage of the light through said cells when said sample cell is positioned in line with one of said apertures, while preventing the passage of light through said cells when said reference cell is positioned in line with the same aperture, means for reuniting said two coherent parallel beams after having passed said cells, a light indicating member, and a lens system to make the optical middle sections of said cells and said light-indicating member optically conjugate at least in a section parallel with said line on which said apertures are situated.

4. An apparatus as claimed in claim 3, in which the light-controlling means comprises means for polarizing the first one of said two coherent beams, means for polarizing the second one of said two coherent beams, the polarization directions being at right angle, analyzing means provided adjacent to the sample cell and having the polarization direction parallel with that of said first polarized beam, analyzing means provided adjacent to the reference cell and having the polarization direction parallel with that of said second polarized beam, and means for rotating the polarization planes of said two polarized beams, after having passed the cells, by 45° in opposite directions.

5. An apparatus as claimed in claim 3, in which the light-controlling means comprise a stroboscope disk having $m$ equidistant openings and arranged coaxially with said rotor, and means for rotating said disk at a speed equal to $1/m$ of the speed of the rotor.

6. An apparatus as claimed in claim 1 in which said reuniting means is identical with said beam splitting means, in combination with means for reflecting the two coherent, mutually parallel beams back through the cells after having passed the same.

7. An apparatus for recording the refractive index of a solution in a rotating centrifuge cell, comprising a centrifuge including a housing and a rotor, a sample cell and a reference cell in said rotor in diametrically opposite positions, a wall of said housing constituting a cell diaphragm perpendicular to the rotor axis which is opaque to light except for two slit-shaped apertures, said apertures being situated on a line perpendicular to and intersecting the extension of the rotor axis, and at a mutual center distance equal to that between said cells, means for producing a beam of monochromatic light, means for splitting said beam into two coherent beams, said splitting means including a half-transparent foil oriented in a plane containing said rotor axis and perpendicular to said line on which said apertures are situated, said half-transparent foil being enclosed between and in optical contact with two congruent plane surfaces of two prisms of an optically transparent and homogeneous material having outer surfaces which are mutual mirror images with respect to said foil, means for making said two coherent beams parallel with the motor axis and for directing them through said diaphragm apertures against and through said cells, means for reflecting said two coherent beams back through said cells after having passed the same, said reflecting means comprising four identical lenses centered two and two on each of the two axes of said beams in such a way that the two inner focal planes of each pair of lenses coincide, the reflecting surfaces of said reflecting means being arranged perpendicular to said axes in the conjugate optical image plane of the cells next to said lenses, said reflected beams being then reunited in said beam splitting means, a light indicating member, and a lens system to make the optical middle sections of said cells and said light-indicating member optically conjugate at least in a section parallel with said line on which said apertures are situated.

8. An apparatus for recording the refractive index of a solution in a rotating centrifuge cell, comprising a centrifuge including a housing and rotor, a sample cell and a reference cell in said rotor in diametrically opposite positions, a wall of said housing constituting a cell diaphragm perpendicular to the rotor axis which is opaque to light except for two slit-shaped apertures, said apertures being situated on a line perpendicular to and intersecting the extension of the rotation axis, and at a mutual center distance equal to that between said cells, means for producing a beam of monochromatic light comprising a light source and a diaphragm having a narrow slit which makes an angle with the line on which said apertures are situated, means for splitting said beam into two coherent beams, said splitting means including a half-transparent foil oriented in a plane containing said rotor axis and perpendicular to said line on which said apertures are situated, said half-transparent foil being enclosed between and in optical contact with two congruent plane surfaces of two prisms of an optically transparent and homogeneous material having outer surfaces which are mutual mirror images with respect to said foil, means for making said two coherent beams parallel with the rotor axis and for directing them through said diaphragm apertures against said cells, means for reuniting said two coherent parallel beams after having passed said cells, a light-indicating member, a lens system to make the optical middle sections of said cells and said light-indicating member optically conjugate at least in a section parallel with said line on which said apertures in said cell are situated, and means for transforming the light deflection in the sample cell into a proportional displacement of light on said light-indicating member, said displacement being effected in a direction perpendicular to said line on which said apertures in said cell diaphragm are situated.

9. An apparatus as defined in claim 8, wherein said transforming means comprises a partially light-obstructing device situated in the optical image plane of said slit in said diaphragm associated with said light source, said device being constituted by a diaphragm having light absorbing and light transmitting portions separated by at least one sharp straight edge, said edge being parallel with the optical image of said slit in said diaphragm associated with said light source, in combination with a diaphragm situated closely in front of said light indicating member and having a narrow slit-shaped light-transmitting opening which is parallel with the line on which said cell apertures are situated and arranged to cut out a narrow strip from the cell images, and means for simultaneously moving said diaphragm of said partially light-obstructing device in a direction parallel with said line on which said cell apertures are situated and said light indicating member in a direction perpendicular thereto.

10. An apparatus as defined in claim 9, in which said diaphragm of said partially light-obstructing device has two mutually parallel, sharp, rectilinear edges, the portion of said diaphragm situated between said edges being light-absorbing.

11. An apparatus as defined in claim 9, in which said diaphragm of said partially light-obstructing device has two mutually parallel, sharp, rectilinear edges forming a narrow slit-shaped light-transmitting opening, said diaphragm being mounted on a shaft.

12. An apparatus as defined in claim 8, wherein said transforming means comprises a partially light-obstructing device situated in the optical image plane of said slit in said diaphragm associated with said light source, said device being constituted by a diaphragm with light-absorbing and light transmitting portions between which there is at least one sharp edge, said edge making an angle with said line on which said cell apertures are situated and intersecting the optical image of said slit in said diaphragm associated with said light source near one end, and said lens system comprises an astigmatic lens system which also makes said partially light-obstructing device and said light indicating member optically conjugate in a section perpendicular to said line on which said cell apertures are situated.

13. An apparatus as defined in claim 12, in which said diaphragm of said partially light-obstructing device has two straight mutually parallel edges forming a slit which makes an angle with said line on which said cell apertures are situated and cuts the optical image of said slit in said diaphragm associated with said light source near one end.

14. An apparatus as defined in claim 12 in which said diaphragm of said partially light-obstructing device has two sharp edges forming a lenticular light-transmitting area of such a figure that the mid-points of all segments which said figure cuts out from straight lines parallel with said slit in said diaphragm associated with said light source image all lie on the same straight line, said lenticular area being situated with one tip on the image of said slit in said diaphragm associated with said light source near one end thereof.

15. An apparatus as defined in claim 12, in which said diaphragm of said partially light-obstructing device has two sharp straight edges forming a wedge-shaped light-transmitting figure having its tip situated on the image of said slit in said diaphragm associated with said light source near one end of the same.

16. An apparatus as defined in claim 13, in which said diaphragm of said partially light-obstructing device has three sharp edges between said light-transmitting and light-absorbing portions thereof, one of said edges being rectilinear and coinciding with the optical image of said slit in said diaphragm associated with said light source which is formed by the light passing said reference cell, the other two edges forming a light-transmitting area of such a shape that the mid-points of all segments which said area cuts from straight lines parallel with said image of said slit in said diaphragm associated with said light source all lie on the same straight line forming an acute angle with said image of said slit in said diaphragm associated with said light source, said light-transmitting area having one tip situated on said image of said slit in said diaphragm associated with said light source, near one end of the same.

17. An apparatus as defined in claim 12, in which said diaphragm of said partially light-obstructing device has three sharp edges between said light-transmitting and light-absorbing portions thereof, one of said edges being rectilinear and parallel with said line on which said cell apertures are situated and intersecting the optical image of said slit in said diaphragm associated with said light source near one end thereof, the other two edges forming a light-transmitting area which intersects said image of said slit in said diaphragm associated with said light source near one end and which has such a form that the mid-points of all segments which the area cuts out from straight lines parallel with said image of said slit in said diaphragm associated with said light source all lie on the same straight line forming an acute angle with said image of said slit in said diaphragm associated with said light source.

References Cited in the file of this patent

UNITED STATES PATENTS

| | | |
|---|---|---|
| 2,256,804 | Hurley | Sept. 23, 1941 |
| 2,718,811 | Riepert et al. | Sept. 27, 1955 |
| 2,745,310 | Horn | May 15, 1956 |

FOREIGN PATENTS

| | | |
|---|---|---|
| 919,843 | France | Dec. 16, 1946 |
| 923,701 | France | Feb. 24, 1947 |
| 355,911 | Great Britain | Sept. 3, 1931 |
| 595,211 | Germany | Apr. 12, 1934 |

OTHER REFERENCES

"A Self-Plotting Interferometric Optical System For The Ultracentrifuge," published in Research, volume 1, 1948, pages 234–236, Philpot and Cook.